United States Patent [19]

Chavel et al.

[11] Patent Number: 5,258,024
[45] Date of Patent: Nov. 2, 1993

[54] METHOD OF MANUFACTURE OF A LENS OF TRANSPARENT POLYMER HAVING A MODULATED REFRACTIVE INDEX

[75] Inventors: Pierre Chavel, Chilly-Mazarin; Denis Joyeux, Les Ullis; Daniel Lougnot, Mulhouse; Dominique Baude, Saint-OUen; Jean-Claude Meslard, Saint-Maurice; Jean Taboury, Sceaux, all of France

[73] Assignee: Essilor International (Compaigne Générale d'Optique), Creteil, France

[21] Appl. No.: 651,352

[22] PCT Filed: May 11, 1990

[86] PCT No.: PCT/FR90/00338

§ 371 Date: Feb. 14, 1991

§ 102(e) Date: Feb. 14, 1991

[87] PCT Pub. No.: WO90/13832

PCT Pub. Date: Nov. 15, 1990

[30] Foreign Application Priority Data

May 12, 1989 [FR] France ................................ 89 06323

[51] Int. Cl.$^5$ ............................................. A61F 2/14
[52] U.S. Cl. ............................................. 623/5; 427/2; 427/164; 424/429; 623/6; 623/4; 351/159; 351/160 R
[58] Field of Search .............. 427/43.1, 44, 53.1, 427/54.1, 55, 2, 353, 164, 508, 510, 512, 519, 520; 264/1.4, 2.6; 623/6, 4, 5; 359/581, 900; 351/160 R, 159; 424/429

[56] References Cited

U.S. PATENT DOCUMENTS

| | | | |
|---|---|---|---|
| 3,953,620 | 4/1976 | Chandross et al. | 427/164 |
| 3,955,015 | 5/1976 | Ohtsuka et al. | 427/164 |
| 3,993,485 | 11/1976 | Chandross | 430/321 |
| 4,073,577 | 2/1978 | Höfer | 264/1.4 |
| 4,152,508 | 5/1979 | Ellis et al. | 526/279 |
| 4,173,475 | 11/1979 | Chandross et al. | 430/290 |
| 4,330,383 | 5/1982 | Ellis et al. | 526/279 |
| 4,447,474 | 5/1984 | Neefe | 427/164 |
| 4,477,557 | 10/1984 | Rauch | 427/54.1 |
| 4,550,059 | 10/1985 | Dalton et al. | 427/44 |
| 4,620,954 | 11/1986 | Singer et al. | 264/1.4 |
| 4,715,858 | 12/1987 | Lindstron | 427/2 |
| 4,752,498 | 6/1988 | Fudim | 427/54.1 |
| 4,777,116 | 10/1988 | Kawatsuki et al. | 430/290 |
| 4,778,256 | 10/1988 | Serizawa | 350/320 |
| 4,824,688 | 4/1989 | Covington | 427/43.1 |
| 4,838,634 | 6/1989 | Bennion et al. | 427/164 |
| 4,948,216 | 8/1990 | Brazas, Jr. et al. | 427/164 |
| 4,961,954 | 10/1990 | Goldberg et al. | 427/2 |
| 5,006,187 | 4/1991 | Cook et al. | 427/54.1 |
| 5,028,358 | 7/1991 | Blum | 427/54.1 |
| 5,147,585 | 9/1992 | Blum | 264/1.4 |

FOREIGN PATENT DOCUMENTS 0064812 11/1982 European Pat. Off. .
0219312 4/1987 European Pat. Off. .
2183246 6/1987 United Kingdom .

OTHER PUBLICATIONS

"Latent-imaging Photopolymer Systems", Chandross et al, Feb. 1978, *Applied Optics*, pp. 566–573.

*Primary Examiner*—Shrive Beck
*Assistant Examiner*—Diana L. Dudash
*Attorney, Agent, or Firm*—Millen, White, Zelano & Branigan

[57] ABSTRACT

The present invention relates to a method of manufacture of an optical lens providing refractive index modulation, characterized in that, starting from a lens of transparent hydrophilic polymer preferably of the hydrogel type, which has previously been shaped, the lens is impregnated with a photopolymerizable composition containing at least one monomer and a photoinitiator, which are in solution in water in the case of a hydrogel, the impregnated lens is subjected to locally modulated irradiation so as to cause local selective polymerization of the monomer, whereupon the excess non-hardened photoinitiator and non-pulverizable monomer is removed.

17 Claims, No Drawings

METHOD OF MANUFACTURE OF A LENS OF TRANSPARENT POLYMER HAVING A MODULATED REFRACTIVE INDEX

CROSS REFERENCE TO RELATED APPLICATION

The United States Application stems from PCT International Application No. PCT/FR 90/00338 filed on May 11, 1990.

BACKGROUND OF THE INVENTION

The present invention relates to the techniques which make it possible to modify the optical properties of a transparent polymer, more particularly when it is sought to modulate the refractive index of a semifinished article of transparent organic material which has previously been polymerized and shaped, without substantially modifying its geometry or its state of surface.

Under these conditions, a preferred application of the invention relates to the manufacture of artificial optical lenses for correcting eyesight such as contact lenses and ocular implants in view of the fact that, in these examples, it is of great importance to preserve a predetermined geometrical shape as well as qualities of surface which ensure, on both faces of the lens, biological compatibility with the ocular medium and absence of irritation of the eye.

The distinctive feature of lenses of this type lies on the one hand in the fact that they have small dimensions and are intended to be employed in full aperture in contradistinction to spectacle lenses, and on the other hand in the fact that they must have a predetermined geometrical shape which will be adapted to the morphology of the wearer's eye in the case of contact lenses, for example, or which will provide basic accommodation power in the case of an implant for the replacement of the crystalline lens of the eye.

In this type of lens, the refractive index modulation contemplated by the invention may be intended in particular to produce a diffraction grating which endows a contact lens with bifocality or an implant for far-sighted persons. In the case of a contact lens, for example, this makes it possible to correct the user's near vision with a power which is determined by this element while correction of distant vision is achieved independently by the geometry of the lens.

It is at present known to construct contact lenses with diffraction elements by modulating the relief of the outer or inner face of the lens. This modulation can be obtained by a machining technique, by etching the lens material at the desired pitch in order to form the diffraction grating. This technique not only calls for the use of equipment involving high cost and delicate maintenance but has the additional disadvantage of being reserved for contact lenses of the rigid type. In regard to molding of the lens directly with the desired relief, this operation calls for preliminary construction of a mold which is just as costly and difficult to machine and is used for a short period of time.

In one case as in the other, the lenses obtained prove unsatisfactory. When the lens has been worn for a certain time, fouling of the diffraction element is observed. This phenomenon is particularly marked when the diffraction element is formed on the inner face of the lens. Moreover, in commercially available lenses of this type and for reasons of adaptation, the curvature of the inner face of the lens has been increased in order to minimize the contact surface between the etched face of the lens and the cornea, thereby increasing the thickness of the tear film and thus producing an additional lens effect having optical characteristics which are not fixed in time by reason of the instability of this tear film.

Another known method for forming diffraction-element contact lenses consists, as described in European patent No. 0,064,812, in applying on the lens a layer of gelatin which is light-sensitized by bichromate treatment and then exposed so as to form a diffraction grating thereon. It is proposed by way of alternative that the gelatin layer can be included within the lens as an intermediate layer in order to avoid any direct contact with the eye since bichromate is known as an irritant compound. It hardly seems possible, however, to adopt this solution in industrial practice.

In point of fact, when it is located on the outer face of the lens, the gelatin layer gives rise to problems relating to insufficient adhesion to the substrate which is constituted by the material of the lens itself. In consequence, said layer is liable to be damaged by the movements of the eyelid and also to be subjected to variations in its degree of hydration by the ocular medium, and therefore to variations in swelling which result in instability of the optical properties of the diffraction element.

It is also known that there exist other methods for forming diffraction gratings on rigid supports by modulating in thickness and refractive index transparent films applied on said supports, this being achieved by producing local photopolymerization of a monomer which is incorporated with a prepolymer. Methods of this type have been proposed for forming waveguide films or holograms.

Since flat thin films are involved in contrast to the present invention, the known methods entail the need to deposit on a rigid support a liquid composition including the basic polymer in solution with the photopolymerizable monomer as well as a photoinitiator which is capable of causing polymerization of said monomer under the action of radiation. The deposit is then hardened by exposing it to a radiation source which is modulated in intensity, in power or in exposure time, or through a mask of suitable shape, whereupon the non-hardened constituents derived in particular from non-irradiated zones of the film are removed. As a result of the deficient stability in time of the refractive index modulations thus obtained, it has sometimes been recommended in addition to carry out a chemical reaction for fixing the monomer on the polymer in order to prevent excessively easy diffusion from destroying the index modulations. Supports of porous silica glass have also been employed for the same purpose.

When it is sought to apply these techniques to the field of optical lenses, it is naturally imperative to ensure that the index modulations achieved remain stable in time and are insensitive to the ocular medium. Moreover, another problem which does not exist in the case of films of the prior art arises from the need to conform to a predetermined lens geometry.

In point of fact, the techniques of screen printing by photosensitization which are applied in the prior art can in no event be directly transposed to refractive index modulation of a polymer to be employed as an artificial optical lens in the eye since they did not need to satisfy the same requirements of geometrical stability, of quality and of biocompatibility of their entire surface.

And when some investigators such as the authors of U.S. Pat. No. 4,778,256 have sought to treat objects and not films on a substrate, the variation involved was in depth and not parallel to the surface as is required by the lenses contemplated by the present invention. Furthermore, the objects treated were in this case also of porous silica glass and not of organic polymer.

SUMMARY OF THE INVENTION

In order to overcome the disadvantages of the prior art techniques, the present invention has the essential aim of forming a diffraction element or of achieving any other type of refractive index modulation within the lens material which is of the organic type. In a general manner, the invention thus makes it possible to treat polymers in the form of semifinished articles without any substrate while satisfying the requirements of artificial optical lenses for ophthalmic use.

A further aim of the invention is to propose combinations of polymers, monomers and photoinitiators which are particularly well-suited for application to the artificial optical lenses of organic material.

In order to satisfy these different objectives, the invention proposes a method of manufacture of an optical lens providing refractive index modulation, characterized in that:

- a preformed matrix of hardened polymer material without a substrate is impregnated by means of a photopolymerizable liquid composition containing a monomer and a photoinitiator for causing polymerization under the action of irradiation;
- the material thus impregnated is subjected to local irradiation which is variable in power and/or exposure time in order to harden said composition locally according to the modulation to be obtained,
- the excess quantity of non-hardened composition is then removed from the material.

In contrast to the known techniques of production of holograms, the method in accordance with the invention and in its initial stage therefore starts from a polymer which has already been entirely hardened, preferably in its definitive shape, said polymer being subsequently impregnated throughout its mass with the photopolymerizable composition which is intended to form the diffraction element.

In consequence, the invention is particularly well-suited for the manufacture of transparent articles with diffraction elements which operate by transmission as is the case with the artificial optical lenses used in ophthalmology either as contact lenses or as implants. In this instance, the diffraction element can advantageously be formed from a so-called optical monomer or in other words a monomer which produces a polymer having optical properties and is also biocompatible as is the case with the polymer of the basic material.

The materials which constitute artificial optical lenses and are the most suitable for the application of the invention are selected from the polymers, including the copolymers, which are obtained from compositions containing at least one monomer selected from the following monomers: the alkyl acrylates, the alkyl methacrylates, preferably methyl methacrylate (MMA), the unsaturated lactams, preferably N-vinylpyrrolidone (NVP), the hydroxyalkyl acrylates or methacrylates, in particular hydroxyethyl methacrylate (HEMA) and di-hydroxy-2,3-propyl methacrylate, methacrylic acid or acrylic acid.

Within the scope of the invention, it is preferable to make use of contact lenses in which the constituent material is obtained by polymerization of monomers or polymer compositions of the following monomers: MMA, HEMA, MMA/NVP, HEMA/NVP. The invention applies with the greatest advantage to polymers which have a cross-linked network, the polymerization and cross-linking reactions being completely terminated prior to the index modulation treatment. Moreover, the method in accordance with the invention is particularly simple and useful in the case of hydrophilic polymers of the hydrogel type.

Other suitable materials in the field of application of the present invention are silicone rubbers, especially those of the lenses described in French patent Application No. 87 14681 filed by the present Applicant, or the acrylate-silicone copolymers which are described, for example, in U.S. Pat. Nos. 4,152,508 and 4,330,383, or the copolymers having a base of acrylate silicone - fluorinated monomer which are described for example in European patent No. 0,219,312.

The monomer which is present in the impregnation composition can be of the same type as those employed in the manufacture of the basic lens material or else of a different type. In both cases, it is an advantage to choose a monomer which, after hardening of the composition in which it is combined with the photoinitiator, results in material having a refractive index which is substantially different from that of the basic lens material. The finished diffraction lens element must be considered here under normal conditions of use.

In consequence, when hydrophilic lenses are concerned, the refractive index of the polymerized composition forming the diffraction grating should be compared with the refractive index of the material in the hydrated state which is often different from that of the non-hydrated material. The polymerized diffraction-grating material itself can sometimes remain hydrophobic without appreciably impairing the general properties of the lens for use in an ocular medium.

In accordance with the invention, it is preferable to make use of a double ethylene bond monomer selected from: the alkyl acrylates and alkyl methacrylates as well as their derivatives, in particular methyl methacrylate; the aromatic vinyl monomers and their derivatives such as styrene, for example; the N-vinyl-lactams and their derivatives, preferably N-vinylpyrrolidone; the hydroxyalkyl methacrylates such as hydroethylmethacrylate.

In regard to the photoinitiator which is present with the optical monomer in the impregnation composition or photosensitization composition, it may consist of any compound which produces free radicals under the action of irradiation, whether alone or by cooperation with another proton donor compound.

It will accordingly be understood that, in order to constitute said composition, the optical monomer and the photoinitiator can be dissolved in a suitable solvent which may in particular be of the proton donor type such as an alcohol, thiol or an amine.

However, in accordance with a first mode of execution of the method which has a justifiable claim to preference, especially in the case of lenses of the rigid type, it appears to be more profitable to employ a liquid composition which is free from solvent, in which the photoinitiator is liquid and miscible with the optical monomer employed or solid but soluble in this latter.

Accordingly, the preferred photoinitiators in accordance with the invention are aromatic compounds having a ketone function and it seems particularly advantageous to employ compounds of the family of acetophenones which are known for their ability to initiate polymerization reactions as a result of rupture of their molecule under the action of irradiation produced by a mercury arc, for example. Among the compounds of this type can be mentioned the photoinitiator designated by the trade name Irgacure 907, the photoinitiator designated by the trade name Darocure 1173 (hydroxy-2 methyl-2 phenyl-1 propanone) and the compounds of the same family as this latter, namely the benzoin ethers, diethoxyacetophenone and 2,2-methoxy 1,2-diphenylethanone.

In the field of application of the present invention, it is usually an advantage to form the diffraction element by means of zones having a very high refractive index in a polymer lens having a lower index. With this object in view, it appears that in the case of the most usual lens polymers, particularly suitable photosensitization compounds contain 10 to 60 % and preferably 25 to 50 % by weight of photoinitiator with respect to the weight of the composition. In the same context, the methyl methacrylate (MMA) is a particularly suitable monomer, especially when it is employed with a photoinitiator of the family known as Darocure (trade name) such as those which are included in the general formula:

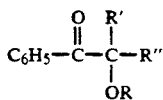

where R is H or an alkyl or aryl radical, R′and R″ are identical or different, each being H, an aryl radical, an alkyl radical, or an —OR‴ group in which R‴ is H or an alkyl or aryl radical; the aryl radicals being in particular the phenyl radical and the alkyl radicals being advantageously constituted by 1 to 5 carbon atoms.

A composition of this type can readily be put to use in accordance with the present invention, simply by immersion of the lens polymer in this composition in the state of a fluid which can consequently penetrate into the polymer without difficulty.

The irradiation of the following stage can be performed by any light source which emits within the range of sensitivity of the photoinitiator employed. In particular, a mercury arc lamp may be employed in the case of the preferred photosensitization compositions. In order to limit the irradiation to the zones of the diffraction grating, it is possible to interpose a mask between the source and the impregnated material or to resort to the use of a laser beam or to interferences of coherent light beams.

Rinsing of the non-hardened composition with a solvent makes it possible to remove this composition from the zones which have not yet been subjected to irradiation. By way of alternative, evaporation of any excess quantity of non-hardened composition can be produced by heating.

Without wishing to give any limitative interpretation of the reactions involved in the hardening of the composition and in the retention of this latter within the basic polymer as achieved selectively in the irradiated zones, it may be assumed that polymerization of the composition takes place as a result of the reaction of the activated photoinitiator with the optical monomer. However, it does not appear that this photopolymerization brings about chemical reactions of fixation with the previously hardened polymer of the basic matrix, at least in the recommended modes of execution of the invention, since on the one hand the polymers preferred for the basic lens material are usually cross-linked and consequently no longer have reactive functions and on the other hand the hardening achieved within the matrix does not appear to affect the intrinsic optical properties of this latter to any appreciable degree.

The refractive index of the composition which is hardened or in particular polymerized to form the diffraction grating within the matrix formed by the basic polymer of the lens determines the law of distribution of energy in the different powers of the diffraction element. This law of distribution therefore depends on the capacity of the basic polymer for absorption of the photosensitization composition and on the nature and proportions of the constituents of said composition.

In accordance with another distinctive feature of the invention, the composition additionally contains a cross-linking agent, the nature and proportion of which are chosen according to those of the optical monomer. Its presence appears to be conducive to permanence in time of the diffraction grating obtained in accordance with the invention.

Any known cross-linking agent may be employed on condition that it is adapted to the optical monomer and makes it possible to retain the requisite transparency of artificial optical lenses.

By way of example:
if the optical monomer employed is N-vinylpyrrolidone, it is preferable to make use of triallylcyanurate or triallylisocyanurate as cross-linking agent, or the alkoxyl dimethacrylates in which the alkoxy pattern can be repeated from 1 to 5 times.

There is more particularly employed a dimethacrylate having the formula:

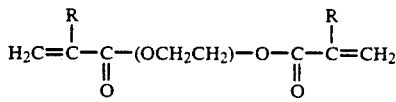

R=H, CH₃
n=1 to 5

If the optical monomer is styrene, divinylbenzene is preferably employed as cross-linking agent;
If the optical monomer is a methacrylate, preference is given to the use of alkyl dimethacrylates in which the alkyl chain can have 1 to 5 carbon atoms.

In another mode of conducting the invention, the polymer is treated in this manner by means of a photopolymerizable composition which is soluble in its utilization swelling medium and while the polymer is in the swollen state in this medium. Thus it may be stated that the polymers constituting lenses in accordance with the invention are preferably hydrophilic polymers of the hydrogel type endowed with a high capacity for absorption of water and that the photopolymerizable composition is accordingly soluble in water. Inscription of the refractive index profile within the hydrogel by the method of the invention accordingly takes place directly in the water-swollen hydrogel by impregnating the hydrogel to saturation with an aqueous solution of the monomer and of a water-soluble photoinitiator.

The present invention therefore proposes in addition a method of manufacture of an optical lens providing refractive index modulation, characterized in that, starting from a previously shaped lens of transparent hydrophilic polymer of the hydrogel type, said lens is impregnated with a photopolymerizable composition containing at least one monomer and one photoinitiator in solution in water, the impregnated lens is subjected to irradiation which is locally modulated in intensity and/or irradiation time, thus producing local selective polymerization of the monomer, and the excess quantity of photoinitiator and non-polymerized monomer is then removed by extraction with water.

In consequence, in accordance with this method, the treated lens is never swollen by a non-aqueous solvent nor dried-up between the successive stages of the method. Furthermore, it has been found that the hydrogels for lenses to be employed in an ophthalmic medium, such as the hydrogels based on methyl methacrylate (MMA) and vinylpyrrolidone (NVP) or on hydroxyethyl methacrylate and vinylpyrrolidone (HEMA/NVP) or else hydrogels of polyhydroxyethyl methacrylate exhibit a specific macromolecular network which is highly conducive to good distribution and stability of an interpenetrated polymer network formed therein by the method of index modulation.

In an advantageous form of practical application of the method, the first stage consists in immersing the previously hydrated hydrogel in an aqueous solution of the photopolymerizable composition so as to cause the polymer to swell by means of this solution, by displacing the pure water which it contains. However, it is also possible to start from a dry hydrogel which is then saturated directly with the aqueous treatment solution. As a general rule, the hydrophilic polymers employed for constituting the basic hydrogel have water absorption capacities of 30% to 80% by volume.

In accordance with the method of the invention as applied to a hydrogel, it is an advantage to make use of monomers consisting of alkyl or hydroxyalkyl methacrylates such as methyl methacrylate or hydroxyethyl methacrylate. However, any other monomer of the types previously defined may be employed. The monomer has very variable degrees of solubility in water and sometimes a low degree of solubility as in the case of methyl methacrylate. But the nature of lenses of the hydrogel type is such that they are capable of internal concentration of the monomer during impregnation. It will consequently be possible to attain the requisite concentrations by employing a sufficient quantity of photopolymerizable composition which is reconstituted periodically. Alternatively, there can be introduced on the sparingly or very sparingly soluble monomers groups which will make them water-soluble without thereby affecting their other properties. For example, it is thus possible and advantageous to use styrene sulfonic acid instead of styrene.

It is worthy of note that the lens is not deformed by the treatment of the invention in spite of what might have been expected, for example, from hydrophobic molecules of methyl polymethacrylate imprisoned in a hydrophilic matrix or from zones of polyHEMA which are hydrophilic but have a swelling ratio of 40%, in a MMA/NVP matrix having a swelling ratio of 70%. A monomer of this type is preferably completed by a cross-linking agent such as a difunctional acrylate or more particularly an alkyl dimethacrylate in which the alkyl chain can contain 1 to 5 carbon atoms.

In regard to the photoinitiator which is present with the modulation monomer in the impregnation composition or photosensitization composition, it can consist of any compound for producing free radicals under the action of irradiation, whether alone or by cooperation with another proton donor compound. It may thus be stated that the photoinitiators employed, or photopolymerization initiators, can be either of the photocleavable type or of the photoactivatable type with a preference, however, for those which are active for initiating photopolymerization of the monomer at irradiation wavelengths within the visible region or near-ultraviolet region.

A photocleavable photoinitiator includes one or a number of compounds which operate by directly generating one or a number of polymerization-initiating free radicals whilst a photoactivatable photoinitiator is formed by a system for producing such radicals by a photoassisted oxidation-reduction reaction between a light-absorbing compound and a hydrogen or electron donor, both of which are present in the system. As will be readily understood, it is also possible to employ mixtures of both types of photoinitiators.

Examples of photocleavable compounds which are known per se are selected from the alcoxyacetophenone derivatives, benzoine ethers, phosphine oxides, benzoyloxime derivatives. Examples of known photoactivatable photoinitiators include an absorber for producing free radicals and selected from the benzophenones, benzyls, xanthones, anthrones, thioxanthones, fluorenones, suberones, acridones, in association with a proton donor compound of the type comprising the ethers, alcohols, amines, aminoacids or organometallic compounds. It will be possible in particular to employ the photoinitiators constituted by thioxanthones which carry an ionic radical such as those of the family described in U.S. Pat. No. 4,791,213 in which the absorption peak is located within the range of 390 to 405 nanometers.

Preferred photoinitiators for refractive index modulation of hydrogels are the salts of thioxanthones and benzophenone which carries an alkylamine or oxyalkylamine radical.

In an advantageous form of practical application of the method, the first stage consists in immersing the previously hydrated hydrogel in an aqueous solution of the photopolymerizable composition so as to cause swelling of the polymer by means of this solution, by displacing the pure water which it contains. Active photoinitiators which are present in a low concentration are preferred for this purpose since they make it possible to avoid a variation of the modulated refractive index within the thickness of the lens, hence the preference given in accordance with the invention to photoactivatable mixtures in which the photoinitiator proper is associated with a proton donor compound.

This accordingly prevents the undesirable appearance of an index gradient as a function of the irradiation depth. In accordance with the invention, this gradient remains within the limits of an acceptable variation of 10 to 20%. The concentration of photoinitiator in the impregnation solution is advantageously within the range of $10^{-5}$M and 0.5M and especially of the order of $10^{-2}$ to $10^{-4}$M.

By exposure of the polymer swollen by the aqueous solution of monomer and photoinitiator through a mask having suitable concentric lines followed by development with water, the invention makes it possible in particular to produce in a contact lens preformed to its final shape, a diffraction grating which is suitable for correcting presbyopia without causing any troublesome physical alteration of the lens, even at the surface. This can be achieved without disturbing the normal operation of additives such as anti-UV agents on the colorants. Furthermore, it is possible to check the index modulation within the thickness in a homogeneous manner and to adjust the energy diffracted in the desired power.

The treatment required for this purpose involves a small number of stages and is simple to perform. The different refractive index lines are formed within the matrix without resulting in surface deformation lines, any overthicknesses being only of the order of 1 to 2 microns. The lines are well delimited and remain so in the course of time. Their fineness can vary as a rule from 500 μm to 10 μm.

As a general rule, the contact lenses to be treated have a thickness within the range of 100 to 500 microns but this thickness varies from the axis to the periphery. The radius of curvature of the swollen lens in the form in which it is used is usually of the order of 6 to 10 on the front face and of the order of 7 to 9 on the rear face.

In the case of a total diameter of the lens of approximately 10 mm, the diffraction grating obtained in accordance with the invention occupies the central zone over a diameter of the order of 4 to 6 mm with a depth extending over the entire thickness of the lens, therefore of the order of 200 μm at the center and of the order of 300 to 400 μm at the edge of the zone. The concentric lines are spaced at 0.5 to 1 mm with respect to the center and are located progressively closer together as the distance from the center increases in the radial direction so as to attain a spacing of 50 to 100 μm at the edge of the zone.

The invention will now be described in greater detail within the scope of particular examples of practical application which are not given in any limiting sense.

EXAMPLE I

A disk of hydrogel constituted by a copolymer of methyl methacrylate (MMA) and of vinylpyrrolidone (VP) previously subjected to a treatment of extraction by tetrahydrofuran so as to eliminate the oligomers is immersed during one hour in a composition containing 75 parts by weight of methyl methacrylate and 25 parts by weight of hydroxy-2 methyl-2 phenyl-1 propanone (commercial product: Darocure 1173). The copolymer employed corresponds to the material for contact lenses designated by the trade name Lunelle (registered trademark).

The swollen product obtained is exposed to radiation by means of an UV source (100-watt mercury-arc lamp) for a period of five minutes through a mask having the shape of the diffraction grating to be formed.

The sample is then immersed overnight in ethanol. This treatment causes the diffraction element to appear. The final product is kept immersed in water or physiological serum.

EXAMPLE II

A hydrogel lens of the Lunelle type (registered trademark) is caused to swell by a mixture containing 60 parts by weight of methyl methacrylate, 20 parts by weight of triethylene-glycol dimethylacrylate and 20 parts by weight of Darocure 1173 (trade name). The lens is subsequently exposed, then washed with ethanol as in Example I.

The diffraction element obtained is very stable in time.

EXAMPLE III

A hydrogel lens of the Lunelle type (registered trademark) is caused to swell over a period of three hours in a mixture containing 60 parts by weight of N-vinylpyrrolidone, 15 parts by weight of triallylisocyanurate and 25 parts by weight of Darocure 1173 (trade name). The lens is subsequently exposed through a mask for one minute, then washed with ethanol. The diffraction element remains visible after hydration.

EXAMPLE IV

A silicone lens is immersed over a period of one hour in a mixture containing 60 parts by weight of MMA, 15 parts by weight of triethylene-glycol dimethylacrylate and 25 parts by weight of Darocure 1173 (trade name). The lens is subsequently exposed, then washed with ethanol as in Example I.

EXAMPLE V

One proceeds under the same conditions as in the preceding examples on permeable rigid lenses of silicone-acrylate by means of a mixture containing 60 parts by weight of methyl methacrylate, 15 parts by weight of triethylene-glycol dimethacrylate and 25 parts by weight of Darocure 1173 (trade name).

EXAMPLE VI

One proceeds under the same conditions as in the previous examples on permeable rigid lenses of fluorinated silicone-acrylate-monomer by means of:

1) a mixture containing 60 parts by weight of methyl methacrylate, 15 parts by weight of triethyleneglycol dimethacrylate and 25 parts by weight of Darocure 1173 (trade name);

2) or a solution containing 75 parts by weight of methyl methacrylate and 25 parts by weight of Darocure 1173 (trade name).

In this example as in the previous examples, any overthicknesses at the surface of the lenses do not exceed 4 to 5 μm and are sufficiently rounded to ensure that they do not constitute any hindrance.

It is apparent in particular from the foregoing examples that an irradiation time within the range of 0.5 to 10 minutes and more particularly of the order of 1 to 5 minutes is usually suitable.

EXAMPLE VII

In this example and in those that follow, the method is applied in an aqueous medium and on hydrogels by employing a water-soluble photoinitiator system.

The basic polymer is a copolymer of methyl methacrylate and N-vinylpyrrolidone (MMA-NVP) of the type marketed by Essilor under the trade name Lunelle. Semifinished samples are thus available in the form of optical lenses 13 to 14 mm in diameter.

The photopolymerizable impregnation base is constituted by a mixture of hydroxyethylmethacrylate (HEMA) and of a difunctional acrylate cross-linking agent: ethylene glycol dimethacrylate (EGDM) in solution in distilled water.

The photoinitiator system consists of a water-soluble thioxanthone marketed by International Biosynthetics under the name Quantacure (QTX) which absorbs at 405 nm in water and has the formula:

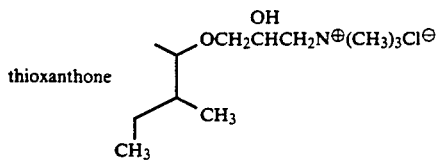

and of a tertiary amine, methyl diethanolamine (MDEA).

The aqueous impregnation composition is formed by a mixture of the pulverizable base and of the photoinitiator system. The ranges of concentration employed are within the following limits:

Concentration in QTX: $10^{-5}$M to 0.5M
Concentration in MDEA higher than $1.7 \times 10^{-2}$M
Concentration in HEMA within the range of 0.6M to 1M
Concentration in EGDM of the order of $10^{-2}$M The irradiation system is constituted by a high-pressure mercury-arc lamp having a power of 100 W, collimated by a lens having a focal distance of 200 mm. The flux density measured in respect of the emission lines at 405–408 nm has a value of 0.75 mW/cm$^2$ at the level of the polymer sample. The visible lines of mercury are selected at the level of the lamp.

The starting lens can be dry or hydrated to water saturation. Swelling of the lens is initiated by immersion in the composition comprising the photoinitiator and the pulverizable base during a period of at least 30 minutes at room temperature. Said lens is then withdrawn from this solution and immediately subjected to the irradiation treatment, then immersed once again but in pure distilled water until the excess quantity of non-irradiated or insufficiently irradiated reagents is extracted by displacement of the species which remain soluble.

In respect of the following concentrations:
QTX = $10^{-4}$M
MDEA = $1.8 \times 10^{-2}$M
HEMA = 0.7M
EGDM = $10^{-2}$M a refractive index variation of $5 \times 10^{-3}$ is obtained after three minutes of exposure in the case of a lens having a thickness of 200 μm and a resolution of at least 20 μm.

This refractive index modulation makes it possible among other things to produce bifocal kinoform diffraction lenses by index variation.

In respect of the following concentrations:
QTX = $10^{-4}$M
MDEA = $1.8 \times 10^{-2}$M
HEMA = 0.7M
EGDM = $10^{-2}$M a variation of $8 \times 10^{-3}$M is obtained after three minutes of exposure in the case of a lens having a thickness of 200 μm.

In respect of the following concentrations:
QTX = $10^{-3}$M
MDEA = $1.8 \times 10^{-2}$M
HEMA = 0.7M
EGDM = $10^{-2}$M an index variation of $10^{-2}$ is obtained after three minutes of exposure in the case of a lens having a thickness of 200 μm.

When subjected to aging tests in physiological serum at 60° C. for a period of one month, the lenses have retained unchanged diffraction efficiency. They do not contain an HEMA monomer which would be liable to modify the properties of the lens by thermal hardening.

EXAMPLE VIII

QTX is replaced by another thioxanthone which has the formula:

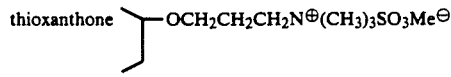

At concentrations which are identical with those mentioned in Example 1, the results are comparable.

EXAMPLE IX

Thioxanthone is replaced by a water-soluble benzophenone designated as Quantacure BTC and developed by International Biosynthetics, having the following formula:

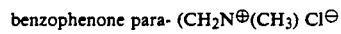

Irradiation is performed in UV radiation at 365 nm, corresponding to the range of sensitivity of thioxanthone.

Photopolymerization is carried out by using for the purpose of impregnating the basic polymer a mixture having the following concentrations:
QTXBTC 4736 = $10^{-3}$M
MDEA = $1.8 \times 10^{-2}$M
HEMA = 0.7M
EGDM = $10^{-2}$M

EXAMPLE X

Triethanolamine (TEA) is employed instead of methyl diethanolamine. The sensitization mixture has the following composition expressed as a concentration of the constituents in water:
QTX = $10^{-3}$M
TEA = $10^{-2}$M
HEMA = 0.7M
EGDM = $10^{-2}$M There is obtained a photopolymerization which makes it possible to produce a diffraction lens.

EXAMPLE XI

Methyl diethanolamine is employed and QTX is replaced by another thioxanthone developed by International Biosynthetics under the trade name Quantacure ABC which has the formula:

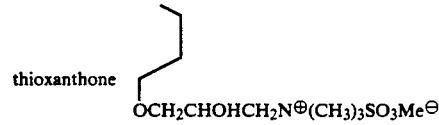

For an exposure time of three minutes, a refractive index modulation of $7.5 \times 10^{-3}$ is obtained in respect of the following concentrations:
Quantacure ABC 4782 = $10^{-3}$M
MDEA = $1.8 \times 10^{-2}$M
HEMA = 0.7M
EGDM = $10^{-2}$M In the foregoing examples which are applicable to hydrogels, any overthicknesses at the surface of the lenses do not exceed 1 to 2 μm. The index variations obtained are of the order of $10^{-2}$ to $10^{-3}$. They depend in particular on the composition of the photopolymerizable solutions in respect of irradiation times within the range of 0.5 to 10 minutes and more particularly of the order of 1 to 5 minutes.

It will naturally be understood, however, that the invention is not limited in any sense by the features which have been specified in the foregoing examples or by the details of the particular modes of execution which have been chosen in order to illustrate the invention. All kinds of alternatives can be considered for the operating conditions as well as for the nature and proportions of the constituents and reagents without thereby departing from the scope of the invention.

We claim:

1. A method for producing an ophthalmic lens, comprising:
   impregnating a self-supportable matrix of cured polymer material in the form of said ophthalmic lens with a photopolymerizable liquid composition containing a monomer and a photoinitiator;
   subjecting the material thus impregnated to local irradiation, modulated in power and/or exposure time, over the surface of said matrix according to a desired pattern of refractive index modulation coresponding to a desired bifocality of said lens, whereby said composition is cured locally according to said pattern; and
   removing the excess quantity of non-hardened composition from the material.

2. Method according to claim 1, wherein said self supportable matrix is a transparent polymer or copolymer obtained from a composition containing at least one monomer selected from the group consisting of acrylates, alkyl methacrylates, unsaturated lactams, hydroxyalkyl acrylates, hydroxyalkyl methacrylates and methacrylic acid.

3. Method according to claim 2, wherein said material is a polymer or copolymer obtained from a composition containing at least one monomer selected from the group consisting of methyl methacrylate (MMA), N-vinylpyrrolidone (NVP), and hydroxyethyl methacrylate (HEMA).

4. Method according to claim 1, wherein said matrix is a rigid transparent polymer suitable for the production of rigid contact lenses or implants and the impregnation composition is a solution of 10–60% by weight of the composition of a hydroxy-2-methyl-2-phenyl-1 propanone photoinitiator and a photopolymerizable double ethylene bond monomer selected from the group consisting of an alkyl acrylate, alkyl methacrylate, their derivatives; an aromatic vinyl monomer, its derivatives; and a vinyl-lactam and its derivatives.

5. A method according to claim 1, wherein said photopolymerizable liquid composition additionally contains a cross-linking agent selected from the group consisting of triallylcyanurate, triallylisocyanurate, divinylbenzene, and a dimethylacrylate having the formula:

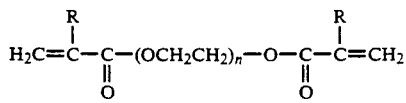

$R = H, CH_3$
$n = 1$ to 5.

6. Method according to claim 1, wherein said irradiation is carried out at a wavelength of the visible region.

7. Method according to claim 1, wherein the photoinitiator contains a photosensitive compound selected from the group consisting of thioxanthones and benzophenones.

8. A method according to claim 1, wherein said matrix is a cured, transparent, hydrophilic, polymeric hydrogel, and the photopolymerizable liquid composition is an aqueous solution.

9. A method according to claim 1, wherein the opthalmic lens is a contact lens.

10. A method according to claim 1, wherein the resultant lens is an implant.

11. A lens as obtained by the method of claim 9.

12. An implant as obtained by the method of claim 10.

13. A method for producing an ophthalmic lens, comprising:
   impregnating a self-supportable matrix of a cured, transparent, hydrophilic, polymeric hydrogel in the form of said ophthalmic lens with an aqueous photopolymerizable solution containing a monomer and a photoinitiator for causing polymerization under the action of irradiation;
   subjecting the matrix thus impregnated to local irradiation according to a desired pattern of refractive index modulation, said irradiation being modulated in power and/or exposure time over the surface of said matrix, whereby said photopolymerizable solution is cured locally according to said pattern; and
   removing the excess non-hardened photopolymerizable solution from the matrix.

14. A method according to claim 13, wherein the aqueous photopolymerizable solution is a solution of a methylmethacrylate or hydroxyethylemethacrylate monomer, a crosslinking agent, a hydroxy-2-methyl-2-phenyl-1-propanone photoinitiator, and an activator, in which the concentration of the photoinitiator is within the range of $10^{-5}M$ to 0.5M, and the crosslinking agent is triallylisocyanurate, divinylbenzene, or a dimethylacrylate having the formula:

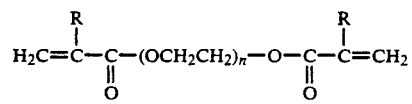

$R = H, CH_3$
$n = 1$ to 5.

15. Method according to claim 14, wherein the concentration of photoinitiator in the aqueous photopolymerizable solution is of the order of $10^{-2}M$ to $10^{-4}M$.

16. Method according to claim 14, wherein the polymer of the self-supportable matrix is a hydrogel based on methyl methacrylate or hydroxyethylmethacrylate cross-linked by a polyfunctional monomer.

17. Lens in the form of a contact lens or ocular implant, comprising a diffraction element obtained within the matrix polymer by a method according to claim 14.

* * * * *